United States Patent [19]
Watzlaw

[11] Patent Number: 5,571,425
[45] Date of Patent: Nov. 5, 1996

[54] METHOD FOR MAKING A SINGLE CONE DISK, IN PARTICULAR A DRESSING WHEEL

[75] Inventor: Hans-Jürgen Watzlaw, Kattendorf, Germany

[73] Assignee: Ernst Winter & Sohn Diamantwerkzeuge GmbH & Co., Norderstedt, Germany

[21] Appl. No.: 552,380

[22] Filed: Nov. 3, 1995

[30] Foreign Application Priority Data

Dec. 3, 1994 [DE] Germany .......................... 44 43 074.4

[51] Int. Cl.⁶ .................................................... B44C 1/22
[52] U.S. Cl. ............................................. 216/33; 216/39
[58] Field of Search ..................... 216/33, 34, 39

[56] References Cited

U.S. PATENT DOCUMENTS 4,320,323  3/1982  Magendans et al. ..................... 216/33
5,435,889  7/1995  Dietrich ................................ 216/39 X

*Primary Examiner*—William Powell
*Attorney, Agent, or Firm*—Vidas, Arrett & Steinkraus

[57] ABSTRACT

A method for making a single cone disk, preferably a dressing wheel, comprising a metal base member having a main surface and head area coated by hard material grains so as to form a hard material grain layer fixed to said base member by metal bonding, in which method a pocket is formed in the back side of the head area of said base members while said metal bonded hard material grain layer is retained thereat, and thereafter the pocket is filled by hard material grains.

6 Claims, 1 Drawing Sheet

METHOD FOR MAKING A SINGLE CONE DISK, IN PARTICULAR A DRESSING WHEEL

The present invention relates to a method for making a single cone disk, preferably a dressing wheel, comprising a metal base member having a main surface and head area coated by hard material grains so as to form a hard material grain layer fixed to said base member by metal bonding.

In disks of this type which are coated by diamonds or other hard material, it is not only the main surface but also the back side of the head area which is coated by the hard material in order to provide for wear resistance.

If this is not provided, there is a risk of wear at the back side of the disk so that there will be no sufficient support for the hard material layer in the head area.

For manufacturing reasons the radius of curvature of the head area of such a disk should not be smaller than a minimal value. If for example single cone dressing wheels for small module ranges are used for example for the dressing of grinding worms which are used to machine gear wheels, relatively small grain sizes have been used for the hard material layer in order to be able to generate the small radii of curvature and head area width necessary for the small module ranges. This results in substantial drawbacks.

Relatively small grain sizes inherently result in a limited service life. The grinding quality of a grinding worm depends on the arrangement and sharpness of the grinding grains on the cutting surface. The dressing wheel having a small grain size results in a small surface roughness depth and reduced grinding capabilities of the grinding worm.

Accordingly, it is an object of the invention to provide a method for making a single cone disk, in particular a dressing wheel, which overcomes the above mentioned drawbacks and which provides for a dressing wheel of a favorable hard material coating, long service life and high processing quality.

In the method of the present invention a pocket is formed in the back side of the head area of said base member while said metal bonded hard material grain layer is retained, and thereafter the pocket is filled by hard material grains.

The method of the present invention starts from a conventional base member the main surface (involute surface) and head area of which are coated by a hard material such as diamond grains or particles. When the coating by for example diamonds has been finished, a pocket is formed at the back side of the disk in the head area. In accordance with the present invention the pocket may be formed by a conventional etching process, by spark erosion, an electrochemical treatment or the like. As an alternative, the pocket may be formed by machining. It is essential that the hard material layer in the head area including the metal bond which may be formed by nickel is retained. Thereafter, the pocket is filled by hard material grains or particles and retained therein by metal bonding. Preferably, the grain size of the diamond grains or particles in the pocket is smaller than that of the layer on the main surface and in the head area.

In contrast to conventional methods the head area may have a radius of curvature which is almost zero. Accordingly, the head area may be of a reduced width which allows for coating by grains of a greater grain size to obtain the same dimensions as in conventional disks or wheels which using a substantially smaller grain size.

In view thereof the method of the present invention allows for a small head area of the grinding or dressing wheel which nevertheless has good grinding qualities and a long service life because the hard material layer may be of a relatively large grain size. The back side of the head area which is subject to wear is sufficiently protected by the hard material within the pocket so that the grinding layer in the head area is always sufficiently supported from the back side.

The invention will now be explained in more detail with reference to the accompanying drawings.

Figure 1:
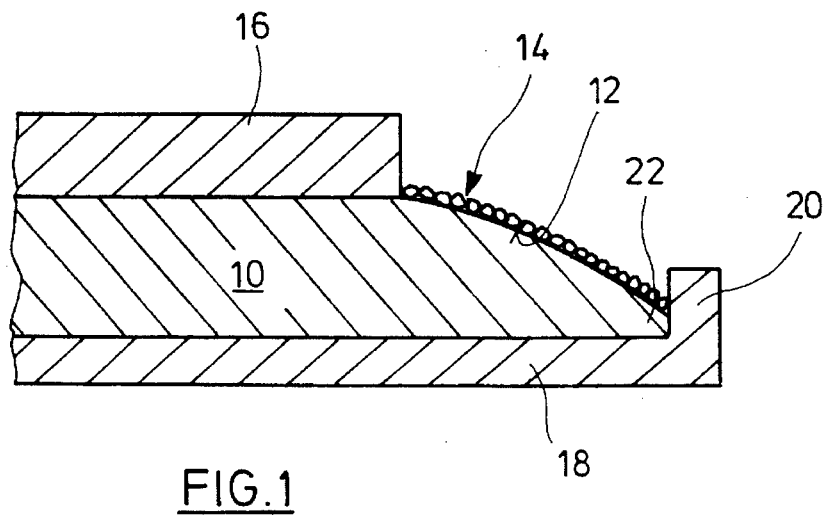
FIG. 1 is a cross-section of a portion of a dressing wheel within a mold.

In FIG. 1 the outer portion of a base member 10 of a circular single cone dressing wheel is shown. It is made for example of steel. The main surface 12 which is slightly arcuate in cross-section as shown is coated by a layer 14 of diamonds in a metal bond. The metal bond comprises for example nickel. The coating is made by a galvanic process; to this end the base member 10 is positioned within a die comprising a pair of die members 16, 18. The die member 18 includes an extension 20 which is engaged by the head area 22 of the base member 10.

Figure 2:
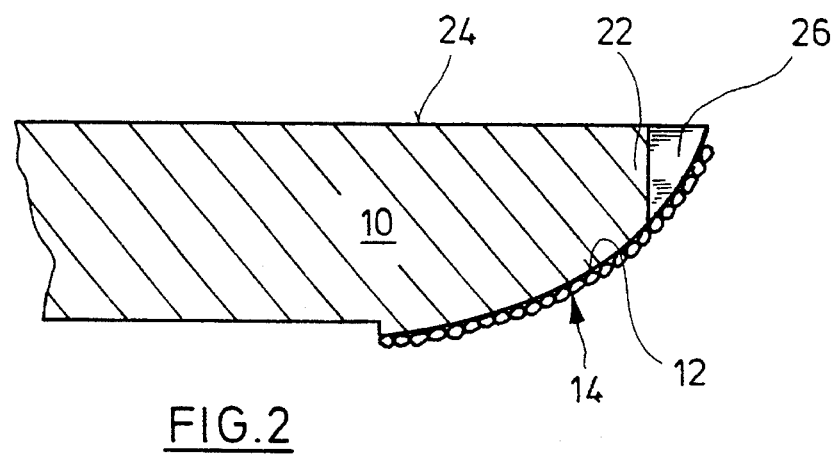
FIG. 2 is a cross-section of a portion of the dressing wheel in FIG. 1 including a pocket in the head area.

By means of a suitable process known in the art, a pocket 26 is formed in the head area 22 from the back side 24 of the base member 10. In FIG. 2 a cross-section of the pocket 26 is shown. It is to be noted that the pocket extends about the complete periphery of the base member 10. As is also shown in FIG. 2, the layer 14 is retained in the area of the pocket 26 when the latter is formed.

Figure 3:
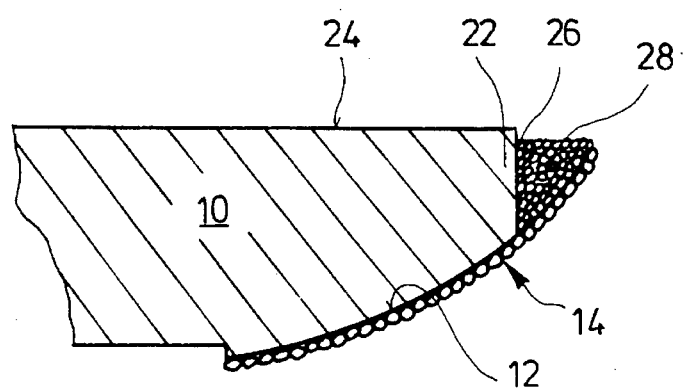
FIG. 3 is a cross-section of the dressing wheel in FIG. 2, with the pocket being filled by diamonds.

In a next step diamond grains or particles in a nickel bond are filled into the pocket as indicated by reference numeral 28 in FIG. 3. The grain size of the diamond layer 28 is smaller than that of the diamond layer 14.

The diamond grains in the pocket 26 provide for stable support of the diamond layer 14 in the head area 22 and protect the back side from abrasive wear.

Instead of diamond grains other hard materials such as CBN or the like may be used to coat the disk and to fill the pocket.

I claim:

1. A method for making a single cone disk, comprising a metal base member having a main surface and head area coated by hard material grains so as to form a hard material grain layer fixed to said base member by metal bonding, in which method a pocket is formed at the back side of the head area of said base member while said metal bonded hard material grain layer is retained thereat, and thereafter the pocket is filled by hard material grains.

2. A method as defined in claim 1, wherein the hard material for filling the pocket is of a smaller grain size than the hard material of said hard material grain layer on said main surface.

3. A method as defined in claim 1, wherein said pocket is formed by an etching process.

4. A method as defined in claim 1, wherein said pocket is formed by a machining process.

5. A method as defined in claim 1, wherein said pocket is formed by a spark erosion or electrochemical process.

6. A method as in claim 1 wherein said disk is a dressing wheel.

* * * * *